US009302619B2

(12) United States Patent
Schumann

(10) Patent No.: US 9,302,619 B2
(45) Date of Patent: Apr. 5, 2016

(54) REAR VIEW CAMERA DISPLAY DURING BRAKING

(71) Applicant: Continental Automotive Systems, Inc., Auburn Hills, MI (US)

(72) Inventor: Clinton Lee Schumann, Royal Oak, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 472 days.

(21) Appl. No.: 13/621,898

(22) Filed: Sep. 18, 2012

(65) Prior Publication Data

US 2013/0120573 A1 May 16, 2013

Related U.S. Application Data

(60) Provisional application No. 61/559,763, filed on Nov. 15, 2011.

(51) Int. Cl.
*H04N 7/18* (2006.01)
*B60R 1/00* (2006.01)
(52) U.S. Cl.
CPC ............... *B60R 1/00* (2013.01); *B60R 2300/70* (2013.01)
(58) Field of Classification Search
CPC ................................. G01C 21/34; B60R 1/00

USPC .......................................................... 348/148
See application file for complete search history.

(56) References Cited

U.S. PATENT DOCUMENTS

| 6,124,647 A * | 9/2000 | Marcus et al. ................ 307/10.1 |
| 2011/0153367 A1 * | 6/2011 | Amigo et al. ...................... 705/4 |
| 2011/0190972 A1 * | 8/2011 | Timmons et al. ............... 701/29 |
| 2012/0179347 A1 * | 7/2012 | Aldighieri et al. .............. 701/70 |

FOREIGN PATENT DOCUMENTS

| EP | 1338473 A2 | 8/2003 |
| KR | 100790796 B1 | 1/2008 |

OTHER PUBLICATIONS

The International Search Report and the Written Opinion of the International Searching Authority. PCT/US2012/055869.
International Preliminary Report on Patentability PCT/US2012/055869 dated May 30, 2014.

* cited by examiner

*Primary Examiner* — Yulin Sun

(57) ABSTRACT

A display system for a vehicle comprises a display mounted within a passenger compartment of a vehicle and at least one camera mounted to the vehicle and facing at least partially in a rear direction. A sensor is connected to the display system for the vehicle. An ECU is controllably connected to the display and the at least one camera. The ECU provides an image from the at least one camera when a predetermined threshold of brake application is sensed or anti-lock brake activity is sensed.

13 Claims, 1 Drawing Sheet

REAR VIEW CAMERA DISPLAY DURING BRAKING

PRIORITY

This application is a non-provisional of, and claims priority to the Nov. 15, 2011, filing date of, U.S. provisional patent application Ser. No. 61/559,763, the entire content of which is incorporated herein by reference.

TECHNICAL FIELD

The present disclosure relates to automotive vehicles, and more particularly to driver assistance devices for automotive vehicles.

BACKGROUND

Rear view mirror and backup camera systems are used to assist a driver in backing up a vehicle and to view vehicles located behind them. Rear view mirrors are typically secured to the top-center of the windshield area for convenience of the driver. However, the mirror may be partially or fully obstructed by window pillars, passengers, luggage, headrests, or other objects located in the passenger area of the vehicle. Therefore, backup camera systems typically are used to view areas immediately behind the vehicle when the vehicle is in reverse.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A display system for a vehicle comprises a display mounted within a passenger compartment of a vehicle and at least one camera mounted to the vehicle and facing at least partially in a rear direction. A sensor is connected to a brake system for the vehicle. An ECU is controllably connected to the display and the at least one camera. The ECU provides an image from the at least one camera when a predetermined threshold of brake application is sensed or anti-lock brake activity is sensed.

A method of controlling a display system for a vehicle comprises sensing a brake application with a sensor for the vehicle. Then comparing the brake application to predetermined threshold. A display screen is changed to display an image from at least one camera when the predetermined threshold of brake application is exceed or anti-lock brake activity is sensed.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
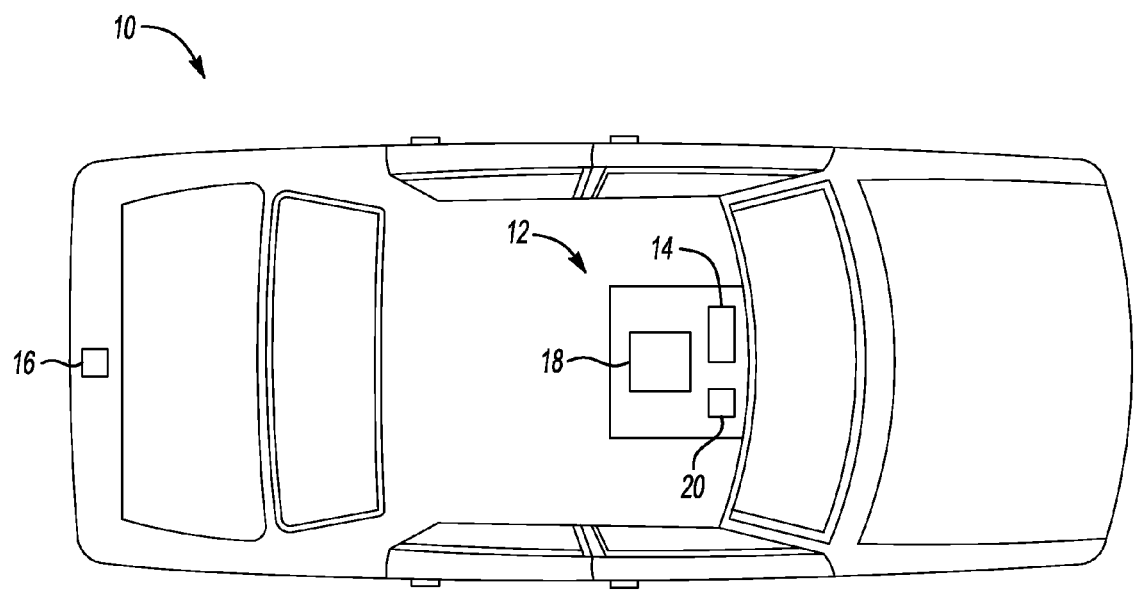
FIG. 1 is a schematic illustration of a vehicle and utilizing a rear view display of the present invention.
Figure 2:
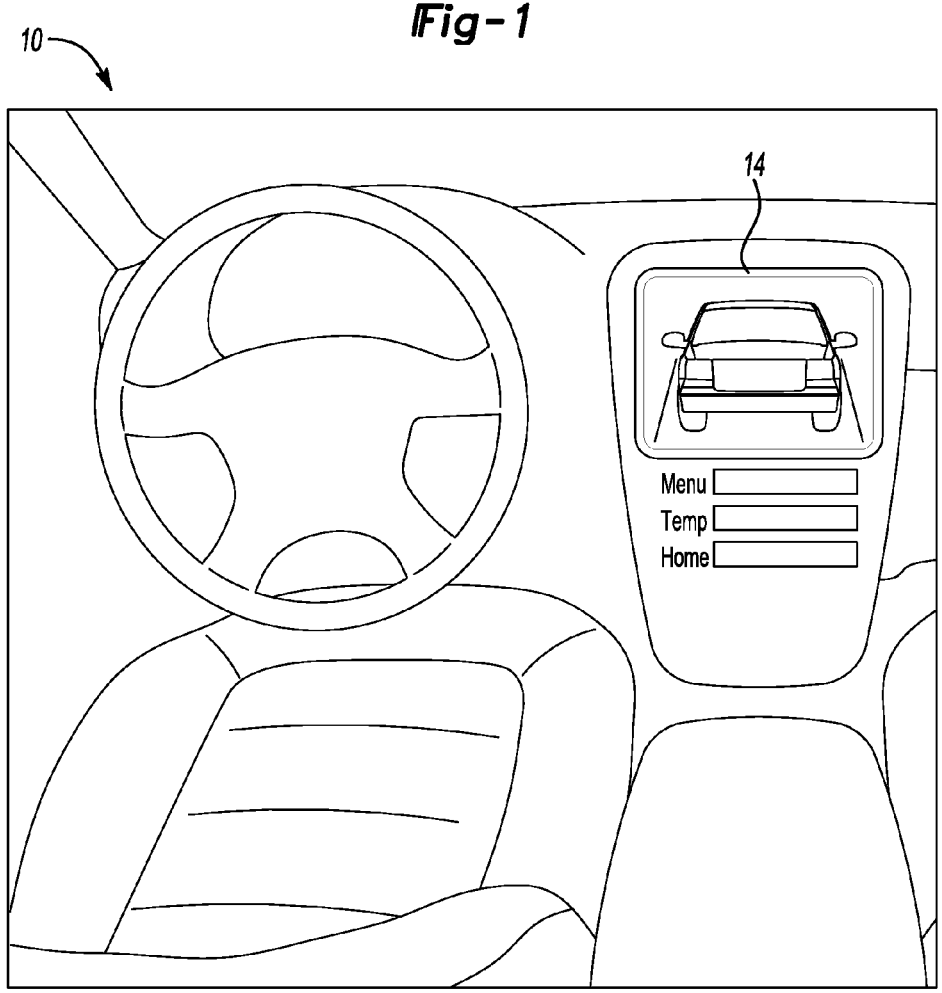
FIG. 2 is a schematic illustration of an exemplary vehicle display utilizing the rear view display of FIG. 1 during braking.

The following description is merely exemplary in nature and is in no way intended to limit the disclosure, its application, or uses. For purposes of clarity, the same reference numbers will be used in the drawings to identify similar elements. FIG. 1 and FIG. 2 illustrate a vehicle 10 and a rear view display system 12 of the present invention. The rear view display system 12 includes a display screen 14 mounted to the vehicle in an easily accessible location for a driver to observe. The display screen 14 may be mounted on an instrument panel of the vehicle 10 and utilized by other systems such as a navigation or audio system. Alternatively, the display screen 14 may also be mounted in the traditional rear-view mirror position. The display screen 14 is connected to at least one camera 16 mounted to the rear of the vehicle 10.

The camera 16 and the display screen 14 are connected to an electronic control unit (ECU) 18 which controls the display screen 14. The display screen 14 may be set to show the navigation system, or radio system display that is selected by the driver of the vehicle 10. Additionally, when the vehicle 10 is in reverse the display screen 14 may show the image from one camera 16 or connected system, such as a back-up assist system. However, during heavy braking the ECU 18 may automatically switch the display screen 14 to show an image from the camera 16. The ECU 18 controls the image on the display screen 14. By having the display screen 14 show an image of the rear of the vehicle 10 the operator will have minimal eye and/or head movement required to view the rear of the vehicle 10 during heavy braking situations.

Typically, during a heavy or panic braking situation a competent driver observes the vehicles/objects directly in front of and directly behind them. Drivers with less experience may fixate on the vehicle directly in front, failing to provide the driver directly behind with a sufficient reaction time. By displaying the rear environment of the heavy braking vehicle 10 in an efficient manner, the driver can view both vehicles directly in front of and behind them with minimal change in line of sight. Therefore, with the rear view display system 12 the driver may be able to avoid an impact with one or both vehicles by monitoring distances of between the vehicles. The brake inputs can thereby be adjusted in a manner that will stop the vehicle 10 without impacting the vehicle directly in front, while simultaneously allowing the driver of the vehicle directly behind ample time to respond to the situation.

The display screen 14 may return to the originally displayed screen after a predetermined period of time or upon completion of the braking event. The camera 16 may also be used by other vehicle 10 systems, such as a vehicle 10 back-up and park assist systems. Additional features such as sensors or cameras for other systems may be connected to the ECU 18 as well to send information that may be displayed or used to display the image on the display screen 14.

Specifically, the display system 12 utilizes data from at least one sensor 20 to determine when braking is occurring. The sensor(s) 20 may indicate actuation of the brakes and may also include information regarding the strength of the brake application. The sensor(s) 20 would provide the information used to determine if a heavy braking situation is occurring, e.g. pressure increase in the master cylinder to be compared to a predetermined threshold. The sensor(s) 20 could be a longitudinal deceleration sensor, a wheel speed sensor(s), a master cylinder pressure sensor, a brake pedal angle sensor, or an anti-lock brake sensor. Any or all of these sensors 20 may be connected to the rear display system 12 and used to determine if heavy braking is occurring. Therefore, the strength of brake application is determined by measuring a longitudinal deceleration with a longitudinal deceleration sensor, calculating a longitudinal deceleration of the vehicle 10 using a wheel speed sensor, measuring a pressure differential using a master cylinder pressure sensor for the brake system, measuring a brake pedal travel using a brake pedal angle sensor, and detecting anti-lock brake activity using an anti-lock brake sensor.

Normally, a backup camera system only displays information when the vehicle 10 is in reverse. The backup camera system could be modified to display the rear view of the vehicle 10 during heavy braking (panic) situations. The ECU 18 may compare the data from the sensor(s) 20 to a predetermined threshold, e.g. braking resulting in an excess of 0.7 g in the longitudinal direction. The ECU 18 may switch the display screen 14 to show the image from the camera 16 any time the predetermined threshold is exceeded or if anti-lock brake activity is sensed.

Other crash mitigation systems do not display the environment of outside the vehicle 10 forcing the driver to utilize rear and side view mirrors. Therefore, the display system 12 may also be utilized by other crash mitigation systems for the vehicle 10. Additionally another radar unit may be installed in the rear of the vehicle 10 and a crash mitigation system can autonomously adjust the braking behavior of the vehicle 10 based on the probably of an impact from objects in front of and behind the vehicle 10.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A display system for a vehicle comprising:
   a display screen mounted on an instrument panel of a vehicle, for selectively displaying a rear view image from the rear of the vehicle, said display screen is used by other vehicle systems in addition to the display system, wherein the display screen will show a display selected by a user;
   at least one camera mounted to the vehicle and facing at least partially in a rear direction said at least one camera is connected to the display screen to selectively send the rear view image;
   a sensor connected to the display system to determine a brake application by the vehicle wherein the sensor transmits data indicative of the brake application; and
   an electronic control unit (ECU) that receives the data from the sensor and the ECU is controllably connected to the display screen and the at least one camera to automatically switch the display screen to provide the rear view image from the at least one camera when the electronic control unit calculates one of a predetermined threshold of brake application is detected and anti-lock activity is detected.

2. The display system of claim 1, wherein the sensor is one of a longitudinal deceleration sensor, a wheel speed sensors, a master cylinder pressure sensor, a brake pedal angle sensor, or an anti-lock brake sensor.

3. The display system of claim 1, wherein the predetermined threshold of brake application is braking sufficient to produce 0.7 g of longitudinal force with the vehicle.

4. The display system of claim 1, wherein the display screen displays an image source that was shown prior to the camera image when one of a predetermined amount of time is exceed and the brake application is complete.

5. A display system for a vehicle comprising:
   a display screen mounted on an instrument panel of a vehicle, for selectively displaying a rear view image from the rear of the vehicle, said display screen is used by other vehicle systems in addition to the display system, wherein the display screen will show a display selected by a user;
   at least one camera mounted to the vehicle and facing at least partially in a rear direction said at least one camera is connected to the display screen to selectively send the rear view image;
   a sensor connected to the display system to determine a brake application by the vehicle wherein the sensor transmits data indicative of the brake application; and
   an electronic control unit (ECU) that receives the data from the sensor and the ECU is controllably connected to the display screen and the at least one camera to automatically switch the display screen to provide the rear view image from the at least one camera when the electronic control unit determines heavy brake activity is occurring.

6. The display system of claim 5, wherein the sensor is one of a longitudinal deceleration sensor, a wheel speed sensors, a master cylinder pressure sensor, a brake pedal angle sensor, or an anti-lock brake sensor.

7. The display system of claim 5, wherein heavy brake activity is braking sufficient to produce 0.7 g of longitudinal force with the vehicle.

8. The display system of claim 5, wherein heavy brake activity is when anti-lock activity is detected.

9. The display system of claim 5, wherein the display screen displays an image source that was shown prior to the camera image when one of a predetermined amount of time is exceed and the brake application is complete.

10. A method of controlling a display system for a vehicle comprising:
    a display screen mounted on an instrument panel of a vehicle, for selectively displaying a rear view image from the rear of the vehicle, said display screen is used by other vehicle systems in addition to the display system, wherein the display screen will show a display selected by a user;
    at least one camera mounted to the vehicle and facing at least partially in a rear direction said at least one camera is connected to the display screen to selectively send the rear view image;
    a sensor connected to the display system to determine a brake application by the vehicle wherein the sensor transmits data indicative of the brake application; and
    an electronic control unit (ECU) that receives the data from the sensor and the ECU is controllable connected to the display screen and the at least one camera to automatically switch the display screen to provide the rear view image from the at least one camera when the electronic control unit calculates one of a predetermined threshold of brake application is detected and anti-lock activity is detected;
    sensing the brake application with the sensor connected to an electronic control unit for the display system;

comparing the brake application to predetermined using the ECU threshold; and changing the display screen to display the image from the least one camera when the electronic control unit determines one of the predetermined threshold of brake application is exceeded and anti-lock brake activity is detected.

11. The method of claim 10, wherein sensing brake application is one of measuring a longitudinal deceleration with a sensor, calculating longitudinal deceleration using a wheel speed sensor, measuring a pressure differential using a master cylinder pressure sensor for the brake system, measuring a brake pedal travel using a brake pedal angle sensor, and detecting anti-lock brake activity using an anti-lock brake sensor.

12. The method of claim 10, wherein the predetermined threshold of brake application is braking sufficient to produce 0.7 g of longitudinal force with the vehicle.

13. The method of claim 10, further comprising changing the display screen to display an image source that was displayed prior to the camera image when one of a predetermined amount of time is exceed and the brake application is complete.

* * * * *